United States Patent [19]
Christopher

[11] 3,965,986
[45] June 29, 1976

[54] METHOD FOR OIL RECOVERY IMPROVEMENT

[75] Inventor: Charles A. Christopher, Houston, Tex.

[73] Assignee: Texaco Inc., New York, N.Y.

[22] Filed: Oct. 4, 1974

[21] Appl. No.: 511,871

[52] U.S. Cl. ............................ 166/292; 166/270; 166/272; 166/273; 166/303
[51] Int. Cl.² ................ E21B 33/138; E21B 43/22; E21B 43/24
[58] Field of Search .......... 166/270, 273, 274, 275, 166/292, 272, 303, 305 R

[56] References Cited
UNITED STATES PATENTS

| | | | |
|---|---|---|---|
| 2,411,793 | 11/1946 | Kennedy et al. | 166/292 |
| 2,993,809 | 7/1961 | Bueche et al. | 427/220 |
| 3,610,339 | 10/1971 | Harvey | 166/274 |
| 3,701,384 | 10/1972 | Routson et al. | 166/292 |
| 3,759,326 | 9/1973 | Christopher et al. | 166/275 |
| 3,817,330 | 6/1974 | Christopher et al. | 166/275 |

*Primary Examiner*—Stephen J. Novosad
*Assistant Examiner*—George A. Suckfield
*Attorney, Agent, or Firm*—Thomas H Whaley; Carl G Ries; Kenneth R. Priem

[57] ABSTRACT

In a subterranean reservoir, a strata or zone of high permeability as compared to other stratas of the reservoir may be plugged by forming a solid gel in situ within the highly permeable strata. The gel plug is formed by injecting a colloidal silica suspension into the strata which is in a liquid state and contacting the suspension in situ with a surfactant. Upon mixing with the surfactant, the colloidal silica suspension forms a gel which effectively plugs the highly permeable zone blocking further fluid flow through the zone.

9 Claims, No Drawings

METHOD FOR OIL RECOVERY IMPROVEMENT

BACKGROUND OF THE INVENTION

1. Field of the Invention

This invention relates to the recovery of oil from subterranean reservoirs of varying permeability.

2. Description of the Prior Art

Since only a portion of the oil contained in a petroleum reservoir can be recovered by primary methods, it has become conventional practice to employ various secondary and tertiary recovery techniques to produce additional quantities of oil not economically recoverable by primary means. One of the various secondary and tertiary recovery methods available is to displace the oil through the reservoir with a driving fluid such as water or steam injected for that purpose. Normally in carrying out the flooding processes, a series of input wells placed apart from one or more producing wells are drilled into and opened to the oil producing strata. The injection well locations with reference to the production well are selected to afford a desired flood pattern. This selected pattern depends in part upon field conditions, the location of existing wells, and the operator's preference. Aqueous drive fluid such as steam, water, brine, or a viscous, aqueous polymer solution is forced into the input wells under pressure and through the surrounding oil bearing strata toward the producing well or wells. While water flooding has been rather widely practiced in recent years, it is not without considerable operating problems and economic limitations, particularly those associated with low oil recovery in proportion to the amount of water injected. Various surfactant and solvent fluids have been proposed as means for recovering additional quantities of oil over that recoverable by conventional water flooding. However these processes face serious operating problems when practiced in heterogeneous formations containing strata or channels having permeability substantially higher than the bulk of the formation. Similar problems occur with steam flooding.

One of the major problems encountered in a flooding operation is breakthrough of the flooding medium from the flood front to the producing well relatively early in the displacement process and rapidly increasing water-/oil ratio at the production well following the initial breakthrough. These difficulties result from displacing the medium channeling through a portion of the oil bearing structure to the producing well thus bypassing large zones of the oil bearing strata. The reason for the channeling of the flooding medium to the producing well and the resulting low oil recovery is due in part to the peculiar structure of the oil bearing strata. Underground oil reservoirs in most cases consist of layers of sand or rock and since no reservoir rock is perfectly uniform in composition and structure, permeability will vary across the rock face or strata. Also, fractures, cracks, vugs and other anomallies can promote channeling of the displacement fluid.

In the normal flooding operation, maximum oil recovery is obtained when the driven fluid fills up in a wide bank in front of the driving fluid which moves uniformly toward the producing well. To keep this bank of oil intact and constantly moving toward the producing well, a substantially uniform permeability must exist throughout the strata. If this uniform permeability does not exist or is not provided, the flooding fluid will seek the areas of high permeability, and channeling occurs with a consequent loss of some driving fluid energy and the appearance of excessive amounts of driving fluid in the producing wells. Moreover, as the more permeable strata are depleted, the driving fluid has a tendency to follow channels and further increase consumption of the flooding medium to the point where the process becomes uneconomical. The maximum limit in terms of recovered oil can be as high as 100 barrels of driving fluid per barrel of oil. It is, of course, desirable to operate at much lower driving fluid to oil ratios and preferably not more than 15 and normally a maximum of 5 to 10 barrels of driving fluid per barrel of recovered oil is considered an acceptable operating condition, particularly where the driving fluid is a low cost agent such as flood water. While a uniform flood front with reduced fingering can be obtained in some formations with a drive fluid rendered more viscous by the addition of various water soluble polymers or other material capable of imparting higher viscosity to the flood water, viscous water flooding is often ineffective in formations having severe heterogeniety as the mobility of the flood water cannot be economically reduced sufficiently to prevent or substantially restrict channeling of the flooding medium. Also, smaller volumes of aqueous polymer solution are sometimes injected into a heterogeneous reservoir to divert subsequently injected flooding media into the less permeable strata, however, such treatments are often ineffective or only partially effective in highly stratified formations. Where a heterogeneous formation is flooded, it is usually found that the flood water or other flooding medium which is introduced into the injection well will enter the various strata open to the well at different flow rates depending upon the permeability of the individual strata relative to the permeabilities of other strata in the formation. The water injection well of this type is said to exhibit a non-uniform injection profile. Heretofore it has been considered that a non-uniform injection profile was symptomatic of channeling and the resulting poor flood medium conformance. Accordingly, it was believed that selective plugging or other treatment to improve or correct the injection profile would ameliorate channeling and result in improved flood water conformance and increase oil recovery. However, most commercially practical selective plugging treatments effect the permeability of the strata only at the well face or for a few feet distance from the well. Since adjacent strata are often in fluid communication throughout all the rest of the substantial part of the formation subjected to flooding, crossflow between the various strata exists and severe channeling develops even though a substantially uniform injection profile is obtained. Thus, in many applications, treatment of the injection wells to improve the water injection profile has no demonstrable effect on oil recovery. Hence, need exists for an improved flooding process for use in heterogeneous formations that will minimize channeling of the flooding medium or bypassing at large areas of the formation, or for a method for improving the effectiveness of the conventional selective plugging process. Accordingly, a principal object of this invention is to provide an improved flooding process for recovering oil from hetergenous petroleum reservoirs. Another object of this invention is to provide an improved method whereby water flooding processes for recovering oil from reservoirs having strata of widely varying permeability may sweep the maximum amount of reservoir possible and not channel into the highly permeable zones.

SUMMARY OF THE INVENTION

The invention is a method of reducing the permeability of a subterranean strata comprising contacting in situ an aqueous slurry of colloidal silica and a surfactant to form a gel.

DESCRIPTION OF THE PREFERRED EMBODIMENTS

The invention is a method for plugging zones or strata of very high permeability in heterogeneous reservoirs thus preventing the flow of fluid into the zones of high permeability so that fluid may be injected into the zones of lower permeability. The invention is useful in a situation where a flooding medium such as water or steam is to be driven from an injection well to a production well driving oil before it; where highly permeable zones and heterogeneous reservoirs are introducing water into the production well at very high rates thus preventing an economical ratio of oil to water in the producing well. The method of my invention will plug zones of very high permeability, thus allowing the fluids to flow into the zones of lower permeability without competition from the higher permeability zones.

Briefly, my invention is forming a gel in situ in the zones of higher permeability thus plugging them and allowing the fluid to flow in the zones of lower permeability. This gel may be formed by combining in situ an aqueous slurry of colloidal silica is and a surfactant. When mixed the aqueous slurry of colloidal silica and surfactant will form a gel which encompass as much of the zone of high permeability as is desired.

Water and colloidal silica may be mixed together to form a fluid which does not manifest a very high viscosity. However, upon contact with a surfactant this aqueous colloidal silica mixture will form a gel. Colloidal silica useful in my invention is different from precipitated silica or silica gel. Colloidal silica useful in my invention is a fumed silica which is made up of chain-like formations centered together. These chains are branched and have enormous external surface areas of from about 50 to about 400 meters$^2$/gm. Each segment of the chain has many hydroxyl (OH) groups attached to silicone atoms at the surface. When the segments come into proximity to each other, these hdroxy groups will bond to each other, by hydrogen bonding and form a three-dimensional network. Colloidal silicas are readily commercially available. One source is the Cabot Corporation of Boston, Massachusetts under the trade name CAB-O-SIL. Colloidal silica useful in my invention is not restricted to this particular product but is defined generally in U.S. Pat. No. 2,993,809. When colloidal silica particles are dispersed in aqueous media wherein no other polar substituents are present, viscosity of the solution will not increase greatly over that of water. However, it is known that the thickening efficiency of the silica is directly related to the polarity of the liquid to be thickened. The use of selected additives such as surfactants and/or multi-functional compounds can increase the thickening efficiency of the silica many times. It is contemplated in the method of my invention to use a surfactant which may broadly be defined as any compound which reduces surface tension of water. Soap may be used. For example, the sodium salts of high molecular weight alkyl sulfates or sulfonates are acceptable. Also very useful are non-ionic surfactants which are usually a reaction production of a hydrophobic and hydrophilic material such as the reaction product between mixed monoalkyl phenols and ethylene oxide. Multi-functional compounds may be used to aid in forming the gel of my invention. The water portion of the slug of my invention which initially carries the colloidal silica into the reservoir may be fresh water or water containing various quantities of inorganic salt such as brine.

My invention may be carried out in different ways; however, the basic aim of my invention is to form in situ a gel which will completely stop fluid flow wherever the gel is formed. This objective may be accomplished by various techniques. For example, in one technique, an aqueous slurry of colloidal silica may be pumped into a heterogenous reservoir. This aqueous slurry of colloidal silica will not have a large viscosity and will seek the highly permeable zones and completely saturate them to any desired depth. The colloidal silica slurry will then cease to be injected and a surfactant solution will be injected. This surfactant solution will follow the same path that the colloidal silica slurry followed before it. The inter-mixing of these fluids within the reservoir will take place almost exclusively within the highly permeable zones where most of the colloidal silica has heretofore gone. Upon contact with the colloidal slurry the surfactant and the colloidal silica will form a gel. This gel will completely plug the matrix of the reservoir in the highly permeable zone and will stop any further fluid flow from taking place into these zones. The fluid flow may then take place into the less permeable zone to obtain a more uniform sweep of the reservoir. In another technique, the colloidal silica slurry and surfactant solutions may be contacted in situ by injecting several alternating small slugs of colloidal silica slurry and surfactant solution. These intermittent small slugs will selectively seek out the highly permeable zones and by injecting alternating slugs of surfactant solution and colloidal silica slurry, better mixing may be accomplished in some cases. In any event, a gel will be formed in this case also.

In one embodiment of my invention, it is envisioned that this technique will be used where there is to be a supplemental recovery operation i.e., a water flood or steam flood. In this situation, it is desired to direct the driving fluid into the less permeable zones so that the fluid is not lost in the highly permeable zones, thus bypassing great amounts of oil in the zones of lower permeabiltiy. It may be desirable to first plug off the highly permeable zone with the gel of my invention and then to proceed with the flooding medium, or alternatively, in some cases it may be desirable to sweep the highly permeable zones of the oil and hydrocarbons that they may contain and then to plug them off with the gel of my invention before proceeding with the water or steam flood operation in the zones of lower permeability. In another embodiment of my invention, it is contemplated that excessive water production in a production well may be stopped or substantially curtailed. In this situation it is usually the case that a zone of high permeability near the production well is producing water at an inordinate rate compared with zones of lower permeability which may contain oil. This is sometimes called bottom water coning. In this case it may be uneconomical to produce the high water/oil ratio mixture. In the method of my invention, the colloidal silica water slurry may be pumped into the production well and into the formation for as great a distance as is desired to be followed with a surfactant solution which upon contact with the colloidal silica aqueous slurry will form a gel thus stopping the water flow from the highly permeable zones and allowing oil flow from the less permeable zones to take place. The effect of this will be to decrease the water/oil ratio and increase the economical aspects of the production well. In this embodiment of my invention, alternating small slugs of colloidal silica and water and surfactant solution may also be used.

PREPARATION OF THE FLUIDS

COLLOIDAL SILICA SLURRY

To a suitable vessel is added fifty barrels of water. Two percent by weight colloidal silica is added to the water with stirring to prepare a slurry. Shear the slurry to affect deaglomeration using a Cowles high speed mixer. Store the slurry with low speed mixing to prevent settling and use within 48 hours.

SURFACTANT SOLUTION

To a suitable vessel is added fifty barrels of water. One percent by weight of a 9.5 mole propylene oxide adduct of nonyl phenol is added to the water with stirring. Store the surfactant solution with low speed mixing.

USE OF THE FLUIDS

Using core data and well logging data, determine the location and approximate pore volume of a highly permeable thief zone which exists in the same reservoir with zones of lower permeability. Inject in the thief zone 0.1 thief zone pore volume of the surfactant solution. Then inject 0.1 thief zone pore volume of the colloidal silica slurry. Alternate injection of surfactant and colloidal silica slurry until a fluid entry survey shows that an improvement in injection profile has been achieved. How the thief zone is plugged or reduced in permeability and injected fluid (steam, water, etc.) will enter the zones of lower permeability.

I claim:

1. A method for reducing the permeability of a subterranean strata comprising
   a. injecting a slug of fumed colloidal silica and water into the reservoir, and
   b. following the slug of fumed colloidal silica and water with a surfactant to form a gel on contact with the fumed colloidal silica slug.

2. A method as in claim 1 wherein the steps are repeated until a desired reduction in permeability is attained.

3. A method for reducing the permeability of a subterranean strata comprising
   a. injecting a slug of surfactant into the reservoir and
   b. following the slug of surfactant with a slug of fumed colloidal silica and water to form a gel on contact with the surfactant slug.

4. A method as in claim 3 wherein the steps are repeated until a desired reduction in permeability is attained.

5. A method of reducing the permeability of a subterranean strata comprising
   contacting in situ an aqueous slurry of fumed colloidal silica and surfactant to form a gel.

6. A method as in claim 5 wherein separate slugs of surfactant and aqueous colloidal silica slurry are introduced into a reservoir via an injection well.

7. A method of claim 6 wherein the injection well is to be used for a steam flooding operation.

8. A method as in claim 6 wherein the injection well is to be used for a water flooding operation.

9. A method as in claim 5 wherein separate slugs of surfactant and aqueous colloidal silica slurry are introduced into a production well to plug water producing strata.

* * * * *